US012607231B2

(12) United States Patent (10) Patent No.: US 12,607,231 B2
Savino (45) Date of Patent: Apr. 21, 2026

(54) DAMPING OF MECHANICAL DRIVE TRAIN

(71) Applicant: Microtecnica S.r.l., Turin (IT)

(72) Inventor: Dario Savino, Palazzolo Vercellese (IT)

(73) Assignee: MICROTECNICA S.R.L., Turin (IT)

( * ) Notice: Subject to any disclaimer, the term of this patent is extended or adjusted under 35 U.S.C. 154(b) by 340 days.

(21) Appl. No.: 18/332,253

(22) Filed: Jun. 9, 2023

(65) Prior Publication Data

US 2023/0417289 A1     Dec. 28, 2023

(30) Foreign Application Priority Data

Jun. 22, 2022     (EP) .................................... 22425027

(51) Int. Cl.
*F16D 3/14* (2006.01)
*H02K 7/00* (2006.01)
*F16F 15/129* (2006.01)

(52) U.S. Cl.
CPC .............. *F16D 3/14* (2013.01); *H02K 7/006* (2013.01); *F16D 2300/22* (2013.01); *F16F 15/1292* (2013.01); *F16F 2228/08* (2013.01)

(58) Field of Classification Search
CPC ....... F16D 3/14; F16D 2300/22; H02K 7/006; F16F 15/1292; F16F 2228/08
USPC ............................................. 464/161; 290/31
See application file for complete search history.

(56) References Cited

U.S. PATENT DOCUMENTS

| | | | |
|---|---|---|---|
| 2,790,311 A | 4/1957 | Kalikow | |
| 4,781,653 A | 11/1988 | Nakamura et al. | |
| 6,688,986 B2 * | 2/2004 | Hojyo | F16F 15/121 |
| 7,377,853 B2 | 5/2008 | Takeuchi et al. | |
| 7,927,219 B2 | 4/2011 | Saeki et al. | |
| 10,808,775 B2 | 10/2020 | Kuwahara et al. | |
| 10,816,039 B2 | 10/2020 | Marechal et al. | |
| 11,143,309 B2 * | 10/2021 | Lemmers, Jr. | F16J 15/3464 |
| 2003/0127930 A1 | 7/2003 | Mackulin et al. | |
| 2008/0196544 A1 | 8/2008 | Kajino et al. | |
| 2009/0214148 A1 | 8/2009 | Lemmers | |
| 2009/0224728 A1 | 9/2009 | Burke et al. | |
| 2010/0283209 A1 | 11/2010 | Vanderzyden | |

(Continued)

FOREIGN PATENT DOCUMENTS

| | | |
|---|---|---|
| DE | 102018109266 A1 | 10/2019 |
| DE | 102019117279 A1 | 12/2020 |

(Continued)

OTHER PUBLICATIONS

Corrosionpedia, Reaction Force, Jul. 19, 2024, retrieved from the internet Nov. 3, 2025, retrieved at <https:www.corrosionpedia.com/definition/1608/reaction-force-compressive-strength>. (Year: 2024).*

(Continued)

*Primary Examiner* — Greg Binda
(74) *Attorney, Agent, or Firm* — CANTOR COLBURN LLP

(57) ABSTRACT

A damping mechanism for providing vibration damping between coaxially mounted first, outer, shaft and second, inner, shaft of a drive train. The damping mechanism includes a friction disk, a Belleville spring and an adjustment shim arranged to be mounted under a pre-load force within the first shaft exerting a force against the second shaft, the damping mechanism arranged to be secured in the first shaft by a locking nut.

11 Claims, 3 Drawing Sheets

(56) References Cited

U.S. PATENT DOCUMENTS

| | | |
|---|---|---|
| 2020/0166109 A1 | 5/2020 | Funasugi et al. |
| 2020/0255131 A1 | 8/2020 | Menair |

FOREIGN PATENT DOCUMENTS

| | | | |
|---|---|---|---|
| JP | S61116234 U | 7/1986 | |
| SU | 636428 | * 12/1978 | .................... 464/161 |
| WO | 0176041 A1 | 10/2001 | |
| WO | 2006118533 A1 | 11/2006 | |

OTHER PUBLICATIONS

Abstract for DE102018109266 (A1), Published: Oct. 24, 2019, 1 page.
Abstract for DE102019117279 (A1), Published: Dec. 31, 2020, 1 page.
European Search Report for Application No. 22425027.4, mailed Jan. 2, 2023, 23 pages.

* cited by examiner

DAMPING OF MECHANICAL DRIVE TRAIN

CROSS REFERENCE TO RELATED APPLICATION

This application claims priority to European Patent Application No. 22425027.4 filed Jun. 22, 2022, the entire contents of which is incorporated herein by reference.

TECHNICAL FIELD

The present disclosure is concerned with providing damping in a mechanical drive train such as for a variable frequency starter generator, VFSG.

BACKGROUND

Power transmission devices are used in many applications e.g. in vehicles or aircraft to transmit torque from a motor to a load to be driven. Torque from the motor is transferred to the load via shafts and, generally, via gearing. In some applications, additional generators are provided to provide power beyond the normal operating range of the main motor. In aircraft, for example, power is also generated by rotation of the aircraft rotors and this can be harnessed by generators which produce electrical energy to power on-board electrical systems and other loads on the aircraft e.g. the environmental control system. Commonly, variable frequency generators are used which can act as a starter (or motor) to start rotation of the gas turbine engine and can, during rotation, also operate as a generator using the power from the rotation to generate electrical energy. The frequency of the generated electrical power varies depending on the speed of rotation of the rotor. These are known as Variable frequency starter generators (VFSGs). In a typical assembly, the turbine engine includes a rotor which, as it rotates, drives a shaft which is connected to a gear box. The gear box translates the rotation to a drive shaft connected to a variable frequency generator. This is connected to motor controllers and/or other loads via a power bus. When operating as a starter, on start-up of the rotor, the VFSG works together with the main motor to start the rotation of the turbine engine.

The VFSG typically includes an input shaft that is connected to an engine accessory gearbox for the torque transfer. More recently, VFSGs have been designed to include a drive shaft coupled to the input shaft, where the coupling is detachable. This enables the VFSG to be decoupled from the transmission in the event of a fault in the VFSG. In some of these systems, there has been a problem that in certain conditions, when a change in power is needed, excessive voltage modulations and mechanical torque oscillations occur which are outside of desired tolerance ranges. It transpired that these problems may be arising due to inadequate damping of the drive train between the gear box and the VFSG—i.e. in the input shaft sub-assembly of the system. There is, therefore, a need to create the necessary damping in the system. At the same time, though, it is desired to retain the decoupling feature between the input shaft and the drive shaft, for safety.

SUMMARY

The present disclosure provides a damping mechanism for providing vibration damping between coaxially mounted first, outer, shaft and second, inner, shaft of a drive train, the damping mechanism comprising a friction disk, a Belleville spring and an adjustment shim arranged to be mounted under a pre-load force within the first shaft exerting a force against the second shaft, the damping mechanism arranged to be secured in the first shaft by a locking nut.

A shaft sub-assembly, a VFSG and a method of damping are also provided.

BRIEF DESCRIPTION

Examples according to the disclosure will now be described with reference to the drawings. It should be noted that these are examples only, and that variations are possible within the scope of the claims.

DETAILED DESCRIPTION

Figure 1:
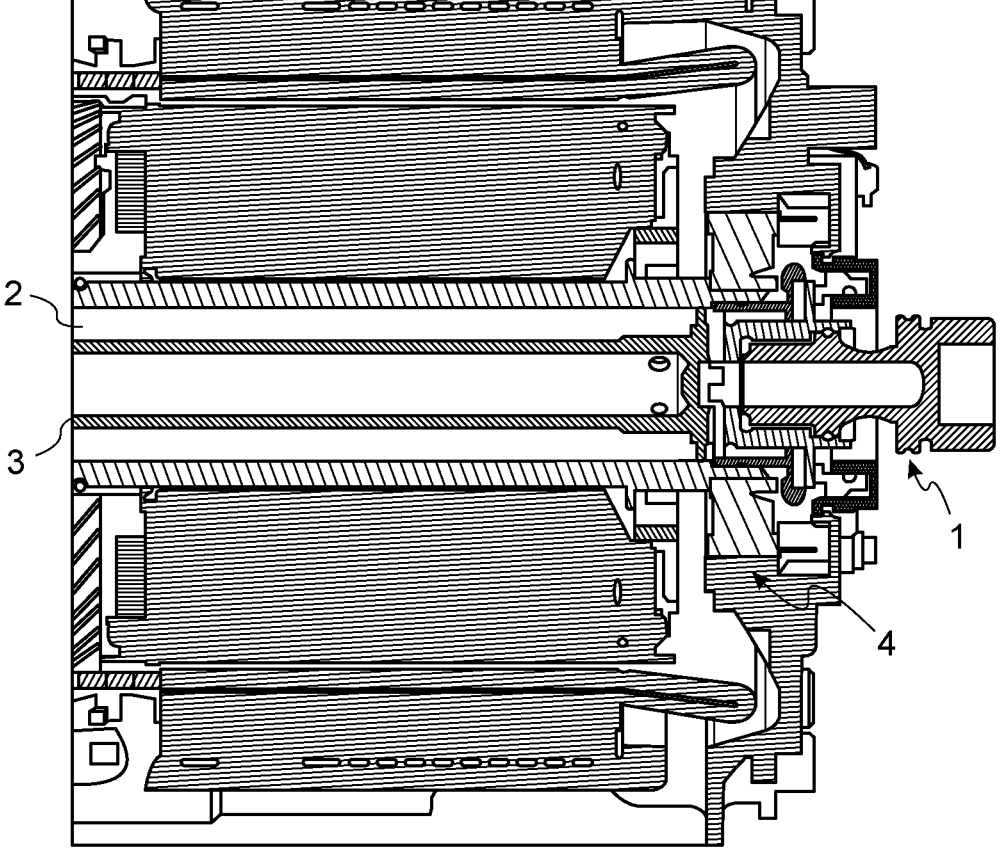
FIG. 1 shows, in cross-section, an input shaft sub-assembly of a variable frequency starter generator, VFSG.

Referring first to FIG. 1, the input shaft sub-assembly of a VFSG is shown. This sub-assembly is typically provided between the VFSG and the engine transmission or the accessory gearbox of a power transmission system, and is composed of interconnected coaxial shafts so that it is possible to disengage the generator (VFSG) from the engine gearbox input. The figure shows, in particular, the input shaft 1 which, in use, is connected to the VFSG. The drive from the aircraft engine gearbox is applied to the input shaft 1. Then, the input shaft transmits the drive to the disconnect shaft 3 that in turns transmits it to the rotor shaft 2. The drive goes in the opposite way when the VFSG is operated as a starter of the aircraft engine. The rotor shaft 2 is the mechanical part that starts rotation of the rotor windings of the VFSG. A bearing 4 is provided for rotation of the rotor shaft. The input shaft 1 is connected to a disconnect shaft 3, which is arranged coaxially inside the rotor shaft 2 and connected to it via a coupling (not shown). In normal operation, rotation of the input shaft causes rotation of the disconnect shaft which, in turn, causes rotation of the rotor shaft. If it is necessary to disengage the input shaft from the rotor shaft e.g. in the event of failure of the VFSG, or for maintenance, the bearing operates to disconnect the input shaft from the disconnect shaft. Rotation of the input shaft, then no longer causes rotation of the rotor shaft. When the engine is driving the VFSG, as a generator, rotation of the rotor shaft causes rotation of the disconnect shaft which rotates the input shaft. The disconnection, via the bearing, prevents rotation of the rotor being transferred to rotation of the input shaft.

The aim of this disclosure is to provide adequate mechanical damping to the system but in a part of the system that still enables the disconnect function. The mechanical damping assembly, as will be described further below, is provided internal to the shaft sub-assembly 10, so does not add to the envelope of the system, and is provided inside the generator between the input shaft and the disconnect shaft.

The mechanical damping according to the disclosure is provided by means of a friction disk element which is pressed against the mating surface between the disconnect shaft and the input shaft by means of a Belleville spring that can be adjusted to provide the necessary compression force to damp vibrations. The damping mechanism damps vibrations between the shafts and so avoids such vibrations being transferred from the disconnect shaft to the input shaft when engaged.

The Belleville spring is adjusted by means of shims interposed between the Belleville spring and a locking nut.

The reaction torque developed by the friction disk is grounded to the rotor shaft via slots machined into the rotor shaft, as will be described further below.

Figure 2:
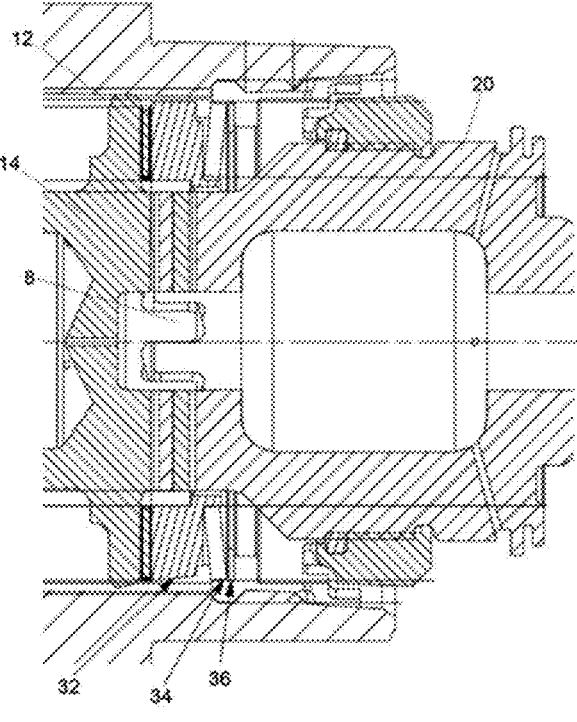
FIG. 2 is an exploded view of the input shaft sub-assembly modified according to this disclosure.

These features will be further described with reference to FIG. 2 and FIG. 3 which collectively show the rotor shaft 12, which is located within the VFSG (not shown). The rotor shaft 12 accepts the disconnect shaft 14 arranged coaxially within it and rotatable relative to the rotor shaft 12. Similarly to the sub-assembly shown in FIG. 1, the input shaft 20 is connected to a disconnect shaft 14 which, in normal operation, provides torque transmitting engagement between the rotor shaft 12 and the input shaft 20.

The damping mechanism of this disclosure is mounted between the input shaft 20 and the disconnect shaft 14, where the two shafts are connected, with the components fitted inside the connecting end 11 of the rotor shaft 12. The damping mechanism 30 comprises a friction disk 32, a Belleville spring 34 (which is a flat, annular resilient disk) and a shim or adjustment washer 36. These are mounted coaxially inside the end 11 of the rotor shaft 12 with the friction disk 32 being located innermost, followed by the Belleville spring 34 and then the adjustment shim 36. These are all annular, ring parts and are secured in place within the rotor shaft 12 by means of grooves 16 on the inner surface of the end 11 of the rotor shaft 12. A nut 40 is attached to the end 11 of the rotor shaft to retain the damping mechanism components in place at their chosen settings.

Because the damping mechanism components are all fitted and secured in the end of the rotor shaft, the disconnection is still possible but, even if the disconnect function is activated, these components remain in position and retain their damping force settings.

The damping mechanism provides a damping force operating on the relative rotation between the disconnect shaft 14 and the rotor shaft 12 as will be explained further below.

The friction disk 32 is an annular ring provided with engagement lugs 33 around the outer periphery to connect the friction disk to the rotor shaft so that it cannot rotate relative thereto. The friction disk is made of a friction material having the required friction coefficients. Any oscillations are prevailing (as far as angular rotations are concerned) in the disconnect shaft 14 because this is the part that has the greater compliance due to its length and reduced thickness. The input shaft 20 and the rotor shaft 12 are quite stiff, the former due to its compact design and the latter due to the windings that it supports. Therefore, when the oscillations are in place, it is convenient to damp them in the disconnect shaft. For this reason, the friction disk 32 is pressed against the disconnect shaft, so that when the shaft oscillates tangential forces (thus a resulting torque) are generated, by effect of the friction, opposing the relative rotation. However, the tangential forces (hence torque) need to be grounded. The slots 16 in the rotor shaft have the function to ground those forces by being engaged by corresponding lugs 33 of the friction disk.

The Belleville spring 34 located axially adjacent the friction disk 32 is provided to adjust the force transmitted to the friction disk by the damping mechanism and to adjust friction due to relative motion of the friction disk and the disconnect shaft. The spring design should satisfy any relevant industry standards, and will have a given pre-load force, a force that it exerts at maximum deflection and a maximum stress.

The adjustment shim 36 is provided to press against the Belleville spring—i.e. to act as a filler between the locking nut 40 and the spring. The thickness of the shim can be precisely selected to ensure the required force or pre-load of the damping mechanism on the disconnect shaft. Whilst the desired values and loads will depend on the system, in one example, the torque to be applied by the friction disk may be 40.38 inlb (4.6 Nm) and the minimum axial load of the Belleville spring is 1731 N.

Figure 3:
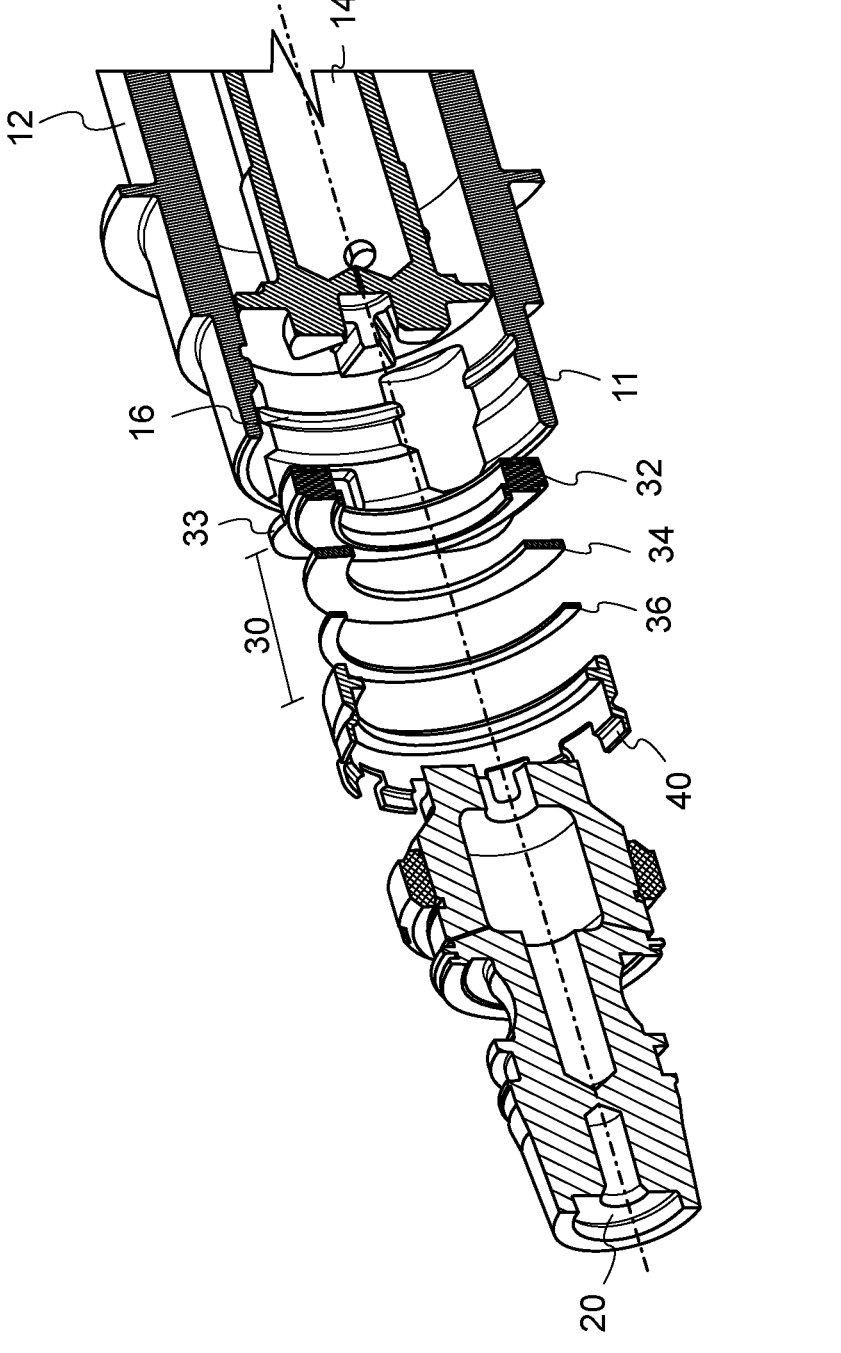
FIG. 3 is a cross-sectional view of a sub-assembly as shown in FIG. 2.

FIG. 3 shows a cross section view of the damping mechanism assembled in the rotor shaft sub-assembly.

The friction torque is developed against the disconnect shaft 14 which engages with the input shaft 20.

This solution allows the mechanical damping to be precisely adjusted based on the specific needs of each unit. The damping mechanism components can be easily fitted into an existing sub-assembly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A shaft sub-assembly of a generator comprising a rotor shaft and a disconnected shaft coaxial with the rotor shaft, wherein the shaft sub-assembly includes a damping mechanism for providing vibration damping between coaxially mounted rotor shaft and disconnected shaft of a drive train, the damping mechanism mounted between and connecting a first end of the rotor shaft and a first end of the disconnecting shaft, wherein the damping mechanism comprising:

a friction disk;

a Belleville spring; and an adjustment shim arranged to be mounted under a pre-load force within the rotor shaft exerting a force against the disconnected shaft, the damping mechanism arranged to be secured in the rotor shaft by a locking nut.

2. The shaft sub-assembly of claim 1, wherein the friction disk, the Belleville spring and the adjustment shim are all annular parts assembled around a common axis.

3. The shaft sub-assembly of claim 1, wherein the friction disk is provided with a plurality of lugs extending radially outwards.

4. The shaft sub-assembly of claim 1, wherein the rotor shaft has one or more grooves in an inner surface thereof, to receive the friction disk.

5. The shaft sub-assembly of claim 1, further comprising:

the locking nut to secure the damping mechanism under a pre-load within the rotor shaft.

6. The shaft sub-assembly of claim 1, further comprising an input shaft connected to the first end of the disconnected shaft.

7. The shaft sub-assembly of claim 6, wherein the third-input shaft is connected to the disconnected shaft via a bearing.

8. The shaft sub-assembly of claim 7, wherein the bearing is arranged to release to disconnect the third input shaft from the disconnected shaft.

9. The shaft sub-assembly of claim 8, wherein the bearing is arranged to release to disconnect the input shaft from the disconnected shaft without releasing the damping mechanism from the rotor shaft.

10. A variable frequency starter generator (VFSG) comprising:

a shaft sub-assembly as claimed in claim 1.

11. A method of damping a shaft sub-assembly as claimed in claim 1, the method comprising:

assembling the friction disk, the Bellville spring and the adjustment shim within the rotor shaft between the first end of the rotor shaft and the first end of the disconnected shaft, under a predetermined pre-load; and securing the pre-loaded damping mechanism inside the rotor shaft by means of the locking nut.

* * * * *